2,979,453
Patented Apr. 11, 1961

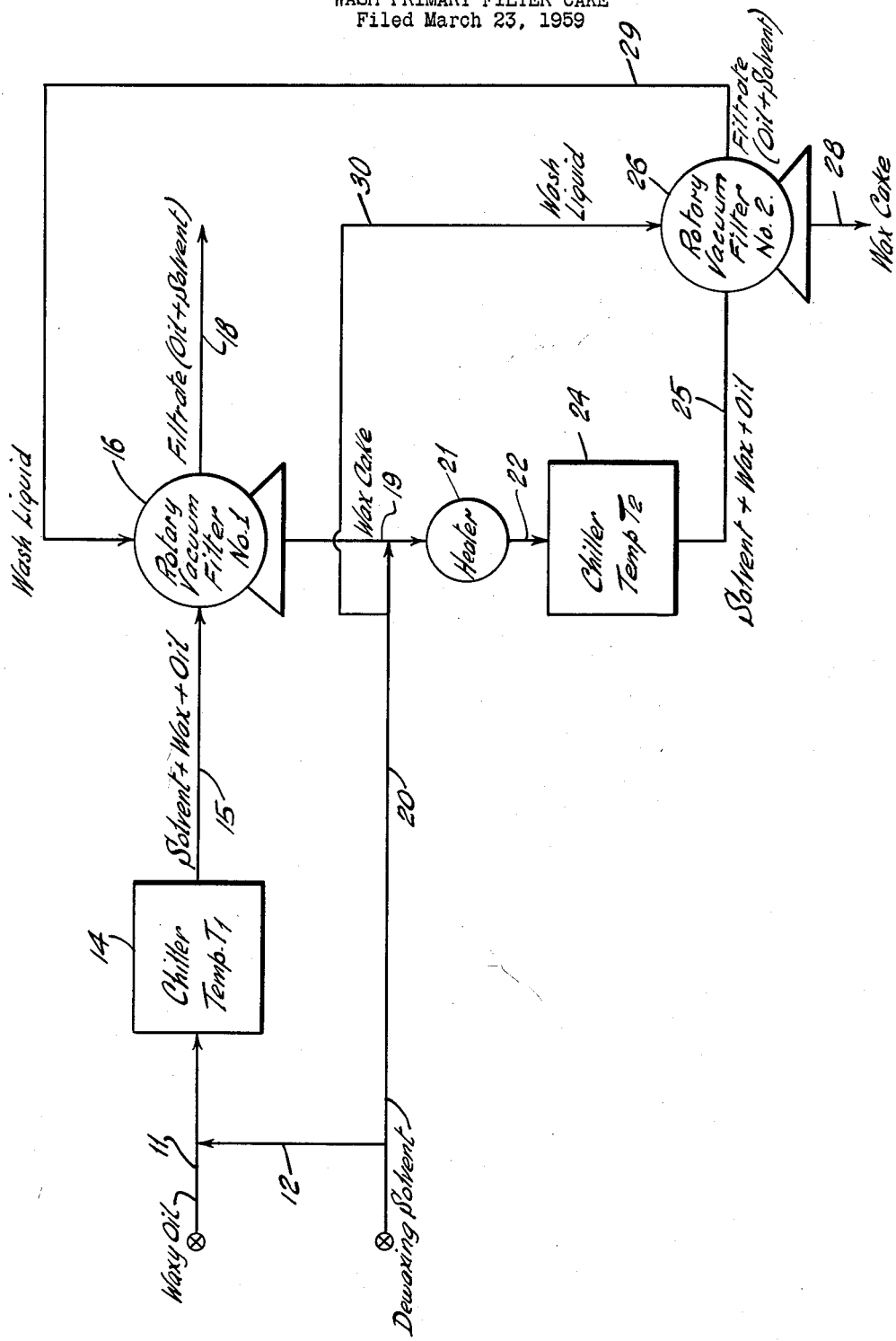

2,979,453

SOLVENT TWO-STAGE FRACTIONAL CRYSTALLIZATION UTILIZING SECONDARY FILTRATE TO WASH PRIMARY FILTER CAKE

Wynkoop Kiersted, Jr., Scarsdale, and Howard H. Gross, Pleasantville, N.Y., assignors to Texaco Development Corporation, New York, N.Y., a corporation of Delaware Filed Mar. 23, 1959, Ser. No. 801,167

13 Claims. (Cl. 208—31)

This invention relates to a solvent fractional crystallization process. In accordance with one embodiment this invention is directed to an improved solvent dewaxing and/or deoiling operation.

In a solvent fractional crystallization process, such as a solvent dewaxing or deoiling operation, it is usually desirable to employ the minimum amount of solvent to effect the desired separation. Handling a minimum amount of solvent is desirable since in these processes the solvent is usually separated by fractional distillation from the material undergoing separation by fractional crystallization and from contaminants, such as water, which might be present in the mixture undergoing fractionation and which tend to reduce the selectivity and/or efficiency of the solvent. Further, as the amount of solvent being handled in the process is reduced heat economies and lower operating costs can be effected.

Accordingly it is an object of this invention to provide an improved method for the fractionation of mixtures by solvent fractional crystallization.

Another object of this invention is to provide an improved solvent dewaxing and/or deoiling operation.

Still another object of this invention is to provide a solvent dewaxing and/or deoiling operation employing a relatively reduced amount of solvent.

How these and other objects of this invention are accomplished will become apparent in the light of the accompanying disclosure and drawing wherein an embodiment of the practice of this invention directed to a solvent dewaxing operation in connection with dewaxing of a waxy oil, is schematically illustrated. In at least one embodiment of the practice of this invention at least one of the foregoing objects will be achieved.

In accordance with this invention an improved solvent fractional crystallization process is provided by subjecting a liquid mixture containing components A and B to cooling to a temperature $T_1$ sufficient to separate a substantial amount of component A therefrom in the solid phase, then separating solid component A from the remaining liquid mixture by filtration thereby forming a filter cake of solid component A, washing the filter cake with a wash liquid to remove said remaining liquid mixture therefrom, separating the washed filter cake of component A and dissolving said filter cake in a solvent therefor at a temperature $T_2$ sufficient to effect dissolution of at only a portion of component A in said filter cake, $T_2$ being greater than $T_1$, separating the undissolved component A from the resulting solution and employing said resulting solution at a temperature $T_2$ as the aforesaid wash liquid.

As indicated hereinabove, the practice of this invention is particularly applicable in a solvent dewaxing and/or deoiling operation. In a solvent dewaxing and/or deoiling operation carried out in accordance with this invention, a waxy oil is subjected to solvent dewaxing at a temperature $T_1$ sufficiently low to precipitate a substantial amount or substantially all of the wax. The resulting precipitated wax is separated from the dewaxed oil and solvent by filtration, such as by means of a rotary vacuum filter. The thus-formed wax filter cake is then washed with a wash liquid to remove occluded residual oil and solvent therefrom. The washed wax cake is then removed from the filter and commingled with additional dewaxing solvent and heated to dissolve substantially all of the wax cake therein. The resulting wax solution is then cooled to a temperature $T_2$, $T_2$ being greater than $T_1$, sufficiently low to precipitate only a portion of the wax. The thus-precipitated wax is separated from the remaining solution by filtration and the resulting liquid filtrate is then employed as the aforesaid wash liquid in the primary dewaxing operation, the wash liquid being at a temperature $T_2$.

In accordance with one modification of the practice of this invention instead of dissolving the wax cake in the dewaxing solvent the wax cake is directly commingled with the dewaxing solvent at the temperature $T_2$ sufficient to effect only partial dissolution of the wax cake in the solvent. The resulting admixture of undissolved wax and wax solution is then subjected to filtration for the separation of the dissolved wax therefrom. The resulting filtrate is then employed as the wash liquid in the primary dewaxing operation.

The practice of this invention is particularly applicable to improving conventional solvent dewaxing and deoiling operations. In a conventional solvent dewaxing operation for the dewaxing of a waxy oil containing a substantial amount of wax, such as an amount of wax in the range 2–40% by wt., more or less, a waxy oil is contacted with a dewaxing solvent and chilled to a suitable low temperature to precipitate solid wax from the resulting admixture. The wax is then separated from the remaining liquid by suitable means such as by filtration employing a rotary vacuum filter. In the operation of the rotary vacuum filter the admixture of wax and remaining liquid comprising dewaxing solvent and dewaxed oil is passed through a suitable filtering medium such as a filter cloth by maintaining a pressure differential thereacross, a higher pressure being maintained on that side of the filtering medium in contact with the admixture undergoing separation than on the underside of the filtering medium through which the remaining liquid passes as filtrate, the wax being deposited on the filtering medium as a wax cake. As the filtering medium is removed from contact with the admixture undergoing separation the resulting wax filter cake built up on the filtering medium is washed by contact with a suitable wash liquid for the removal of residual, occluded remaining liquid (filtrate) from the wax filter cake.

In accordance with this invention advantages are achieved by employing as the wash liquid the filtrate derived from a secondary dewaxing or deoiling or wax fractionation operation carried out at a temperature higher than the aforesaid primary solvent dewaxing operation. More particularly, the resulting washed wax filter cake is separated from the filtering medium by suitable means such as a blade scrapper or the like and commingled with additional dewaxing solvent. The resulting admixture of wax filter cake and dewaxing solvent may be brought to a temperature sufficiently high to effect substantially complete dissolution of the wax filter cake in the dewaxing solvent; or, if desired, the resulting admixture of wax filter cake and dewaxing solvent may be brought to a temperature, such as a temperature $T_2$, sufficient to dissolve only a portion of the wax in the wax filter cake. In the instance where the wax filter cake is completely dissolved in the dewaxing solvent the resulting solution is then cooled to a suitable temperature, such as temperature $T_2$, sufficiently low to precipitate a portion of the wax from the resulting solution. A resulting precipitated wax is separated from the remaining solution at a temperature $T_2$, in both instances, by suitable means such as by filtration. The resulting separated remaining solvent or secondary filtrate at a temperature $T_2$ is then recovered from the undissolved wax and employed as the aforesaid wash liquid in the above-described primary filtration or dewaxing operation. By operating in the above-indicated manner the use of additional dewaxing solvent as wash liquid in the primary filtration or dewaxing operation is avoided thereby reducing the amount of dewaxing solvent which must be handled and processed in the overall dewaxing operation.

Any suitable dewaxing or deoiling solvent may be employed in the practice of this invention. Suitable dewaxing solvents include those liquids which evidence a preferential solubility for normally liquid hydrocarbons over waxy or normally solid hydrocarbons and liquid mixtures of a wax solvent and a wax anti-solvent. Exemplary dewaxing solvents are liquid propane, a liquid admixture of a normally liquid aromatic hydrocarbon such as benzene, toluene, the xylenes, ethylbenzene, in general aromatic hydrocarbons containing from 6 to 10 carbon atoms per molecule, and a normally liquid aliphatic ketone such as acetone, methyl ethyl ketone, methyl n-propyl ketone, methyl isobutyl ketone, in general aliphatic ketones containing from 3 to 9 or 10 carbon atoms per molecule. The proportions of aromatic hydrocarbon and aliphatic ketone in a conventional dewaxing solvent is usually in the range 10–90 to 90–10% by wt., respectively. Moreover, if desired, it may be preferable in some instances to employ as a dewaxing or deoiling solvent a mixture of only aliphatic ketones or only one of the aforesaid ketones. Other dewaxing and/or deoiling solvents are known and may be employed in the practice of this invention.

In the primary or initial dewaxing operation wherein a waxy oil is reduced to a low temperature to separate wax therefrom, the primary dewaxing operation or primary filtration operation is usually carried out at a relatively low temperature, such as a temperature in the range minus 50 to about 30 or 50° F., depending upon the waxy oil feed and/or dewaxing solvent and/or amount of wax to be removed.

In the secondary dewaxing or deoiling operation wherein the wax filter cake from the primary dewaxing or filtration operation is fractionated by contact with additional dewaxing solvent at a relatively high temperature $T_2$ with respect to the primary filtration temperature with the resultant separation of wax and a secondary filtrate which is employed as wash liquid in the primary filtration operation, the secondary dewaxing and deoiling temperature $T_2$ is usually greater than the primary dewaxing temperature $T_1$ by an amount in the range 2–50 degrees Fahrenheit, more or less, the secondary filtration operation usually being carried out at a temperature in the range minus 20 to about 50–100° F., depending upon the composition of the dewaxing or deoiling solvent employed in the secondary filtration operation and/or the extent of wax fractionation or separation desired to be accomplished. The dewaxing or deoiling solvent employed in the secondary filtration operation or wax fractionation operation need not have the same composition as the dewaxing solvent employed in the primary dewaxing or filtration operation. A solvent of any suitable composition may be employed.

Any suitable amount of dewaxing or deoiling solvent relative to the waxy oil undergoing fractionation effective to accomplish the desired fractionation may be employed in the practice of this invention. Usually in the primary dewaxing or filtration operation an amount of dewaxing solvent within the range 0.25:5–10 vol. of solvent per volume of waxy oil is sufficient. Substantially the same proportions may be employed in the subsequent secondary dewaxing operation from which the wash liquid employed in the primary dewaxing operation is recovered.

The practice of this invention is not only applicable to the solvent fractional crystallization or fractionation of waxy oils or oily waxes which might contain a major or minor amount of wax or oil, respectively, but is also applicable to the solvent fractional crystallization of mixtures of fatty oils or acids or derivatives thereof, such as animal fats, e.g. lard, or vegetable oils such as tung oil, soy bean oil, linseed oil, cotton seed oil, as well as fish oils such as codfish oil, herring oil, sardine oil, whale oil, and the like, substantially all of which contain mixtures of fatty acid glycerides or other derivatives thereof and the like.

Referring now to the accompanying drawing which schematically illustrates the practice of this invention as applied to the dewaxing of a waxy oil such as a lubricating oil fraction and the subsequent fractionation of the wax derived from the primary dewaxing operation, a waxy oil containing a substantial amount of wax, 5–25% by wt., is supplied from a suitable source via line 11 and after admixture with a suitable amount of dewaxing solvent introduced thereinto by means of line 12 is passed through chiller 14 wherein the resulting admixture of waxy oil and dewaxing solvent is reduced to a suitable low temperature $T_1$ in the range minus 30 to 0° F., sufficient to precipitate substantially all of the wax from the oil. The resulting admixture of precipitated wax, dewaxing solvent and dewaxed oil is removed from chiller 14 via line 15 into a first rotary vacuum filter 16 by means of which the solid wax is removed from the remaining liquid by vacuum filtration with the resultant formation of a wax cake and a primary filtrate containing dewaxing solvent and dewaxed oil. The filtrate is removed from the first rotary vacuum filter 16 for further processing via line 18.

The separated wax cake is removed from filter 16 via line 19 and after admixture with a suitable amount of dewaxing solvent supplied via line 20 from a suitable source, not shown, is heated within heater 21 to a suitable temperature, such as a temperature high enought to effect substantially complete dissolution of the wax cake in the solution admixed therewith. The resulting solution is removed from heater 21 via line 22 and introduced into chiller 24 wherein its temperature is reduced to a value $T_2$, $T_2$ being greater than $T_1$, such as a temperature in the range minus 10° F. to 50° F. The resulting admixture of undissolved wax and remaining liquid containing dewaxed oil and solvent is introduced from chiller 24 via line 25 into a second rotary vacuum filter 26 wherein it is subjected to vacuum filtration for the separation of undissolved wax therefrom. The resulting separated wax is separately recovered from vacuum filter 26 via line 28 as product. The remaining liquid or secondary filtrate containing solvent and dewaxed oil together with an amount of wax dissolved therein at a temperature $T_2$ is recovered from filter 26 and employed as the wash liquid for use in connection with the primary dewaxing or filtration operation carried out by means of rotary vacuum filter 16, the secondary filtrate as a temperature $T_2$ being carried from the second rotary vacuum filter 26 to the first rotary vacuum filter 16 via line 29. As indicated in the drawing dewaxing solvent is employed as the wash liquid in the secondary filtration operation being supplied thereto via lines 20 and 30.

By operating in the aforesaid manner in accordance with this invention, that is by employing filtrate recovered from the secondary dewaxing or deoiling operation as the wash liquid in the primary dewaxing or deoiling operation substantial savings in operating costs and in solvent costs are possible.

As will be apparent to those skilled in the art in the light of the accompanying disclosure many changes, alterations and modifications may be possible in the practice of this invention without departing from the spirit or scope thereof.

We claim:
1. A method of fractionating a liquid mixture containing components A and B which comprises cooling said mixture to a temperature $T_1$ sufficient to separate a substantial amount of component A therefrom in the solid phase, separating solid component A from the remaining liquid mixture by filtration thereby forming a filter cake of solid component A containing occluded remaining liquid mixture, contacting said filter cake with a wash liquid produced as hereinafter described, separating wash liquid containing removed occluded remaining liquid mixture from washed filter cake of component A, separating said washed filter cake of component A, dissolving said washed filter cake in a solvent therefor at a temperature sufficient to effect substantially complete dissolution of said washed filter cake in said solvent, chilling the resulting solution to a temperature $T_2$ to precipitate a substantial portion of component A from said solution, $T_2$ being greater than $T_1$, separating the precipitated component A from the resulting solution at a temperature $T_2$ and employing said resulting solution at a temperature $T_2$ as the aforesaid wash liquid.

2. A method of dewaxing a waxy oil which comprises cooling said oil in admixture with a dewaxing solvent to a temperature $T_1$ sufficient to separate a substantial amount of solid wax from said oil, separating solid wax from the dewaxed oil by filtration thereby forming a wax filter cake containing occluded dewaxed oil, contacting said wax filter cake with a wash liquid produced as hereinafter described, separating wash liquid containing removed occluded dewaxed oil from washed wax filter cake, separating said washed wax filter cake, commingling said washed wax filter cake in a solvent therefor at a temperature $T_2$ to dissolve a portion of the wax, $T_2$ being greater than $T_1$, separating the undissolved wax from the resulting solution and employing said resulting solution at a temperature $T_2$ as the aforesaid wash liquid.

3. A method of dewaxing a waxy oil which comprises admixing said oil with a liquid dewaxing solvent, chilling the resulting admixture to a temperature $T_1$ to precipitate substantially all of the wax from the resulting admixture, separating by filtration the resulting precipitated wax thereby forming a wax filter cake containing occluded dewaxed oil, contacting said wax filter cake with a wash liquid produced as hereinafter described, separating liquid containing removed occluded dewaxed oil from washed wax filter cake, removing said washed wax filter cake and commingling therewith a solvent therefor at a temperature $T_2$ to dissolve at least a portion of the wax, $T_2$ being greater than $T_1$, subjecting the resulting commingled solvent and wax to filtration to separate undissolved wax therefrom, recovering the resulting remaining liquid containing solvent and wax dissolved therein at a temperature $T_2$ and employing said remaining liquid at a temperature $T_2$ as said wash liquid.

4. A method in accordance with claim 3 wherein said solvents comprise a mixture of a normally liquid aliphatic ketone and a normally liquid aromatic hydrocarbon in the percent weight range 10-90 and 90-10%, respectively.

5. A method in accordance with claim 3 wherein said solvents comprise an admixture of methyl ethyl ketone and toluene.

6. A method in accordance with claim 3 wherein the temperature $T_2$ is greater than the temperature $T_1$ in an amount in the range 2-50 degrees Fahrenheit.

7. A method of dewaxing a waxy oil which comprises admixing said waxy oil with a dewaxing solvent containing a normally liquid aromatic hydrocarbon as a wax solvent admixed with a normally liquid aliphatic ketone as a wax anti-solvent, cooling the resulting admixture to a temperature $T_1$ to precipitate substantially all of the wax from said oil, separating the resulting precipitated wax by filtration thereby forming a wax filter cake containing occluded dewaxed oil-dewaxing solvent mixture, contacting said wax filter cake with a wash liquid produced as hereinafter described, separating wash liquid containing removed occluded dewaxed oil-dewaxing solvent mixture from washed wax filter cake, removing the resulting washed wax filter cake and admixing therewith additional dewaxing solvent, dissolving said washed wax filter cake in said additional wax solvent, chilling the resulting solution to a temperature $T_2$, $T_2$ being greater than $T_1$, sufficient to precipitate a portion of said wax from said resulting solution, separately removing the thus-precipitated wax and the resulting dewaxed oil in admixture with said additional solvent as filtrate at a temperature $T_2$ and employing said filtrate as a temperature $T_2$ as said wash liquid.

8. A method in accordance with claim 7 wherein said temperature $T_1$ is in the range minus 50 to 30° F. and wherein said temperature $T_2$ is in the range minus 20 to 80° F.

9. A method of fractionating a waxy mixture wherein said mixture comprises a major amount of wax, said mixture comprising solid wax admixed with oil, which comprises commingling said mixture with a solvent for oil at a temperature $T_1$ such that substantially all of the wax in said mixture is present as solid wax and substantially all of said oil in said mixture is dissolved in said solvent, separating by filtration solid wax from the dewaxed oil thereby forming a wax filter cake containing occluded remaining liquid mixture, contacting said wax filter cake with a wash liquid produced as hereinafter described, separating wash liquid containing removed occluded remaining liquid mixture from washed waxed filter cake, removing the resulting washed wax filter cake and commingling therewith additional solvent at a temperature $T_2$, $T_2$ being greater than $T_1$, to dissolve at least a portion of said wax in said solvent, subjecting the resulting commingled admixture to filtration to separate undissolved wax therefrom and to recover dewaxed oil and solvent together with some dissolved wax as filtrate, and employing said filtrate as said wash liquid.

10. A method of fractionating a liquid mixture containing components A and B and a liquid solvent for at least one of said components which comprises cooling said mixture to a temperature $T_1$ sufficient to separate a substantial amount of component A therefrom in the solid phase, separating resulting solid component A from the remaining liquid mixture by filtration thereby forming a filter cake of solid component A wetted with said remaining liquid mixture, contacting said filter cake with a wash liquid produced as hereinafter described, separating wash liquid containing removed remaining liquid mixture from washed filter cake of component A, separating the washed filter cake of component A and commingling said filter cake of component A with additional said solvent at a temperature $T_2$ sufficient to dissolve therein a substantial amount of component A, $T_2$ being greater than $T_1$, separating the undissolved component A from the resulting solution at a temperature $T_2$ and employing said resulting solution at a temperature $T_2$ as the aforesaid wash liquid.

11. A method in accordance with claim 10 wherein said liquid mixture is a waxy oil and wherein said solvent is a dewaxing solvent.

12. A method in accordance with claim 11 wherein said dewaxing solvent comprises a liquid admixture of a wax solvent and a wax anti-solvent.

13. A method in accordance with claim 11 wherein said solvent is a liquid admixture containing a normally liquid aromatic hydrocarbon and a normally liquid aliphatic ketone containing from 3 to 9 carbon atoms per molecule.

References Cited in the file of this patent
UNITED STATES PATENTS

| | | |
|---|---|---|
| 1,831,433 | Zoul | Nov. 10, 1931 |
| 1,929,821 | Manley | Oct. 10, 1933 |
| 1,968,239 | Adams | July 31, 1934 |
| 2,161,569 | Gross | June 6, 1939 |
| 2,164,779 | Manley | July 4, 1939 |
| 2,193,767 | Manley et al. | Mar. 12, 1940 |
| 2,723,941 | Weeks et al. | Nov. 15, 1955 |